Patented Aug. 10, 1954

2,685,707

UNITED STATES PATENT OFFICE 2,685,707

EXTRUSION OF TETRAFLUOROETHYLENE POLYMER

Walter E. Llewellyn and John F. Lontz, Nutley, N. J., assignors to E. I. du Pont de Nemours & Company, Wilmington, Del., a corporation of Delaware No Drawing. Application June 30, 1950, Serial No. 171,534

11 Claims. (Cl. 18—55)

This invention relates to an improved process for the extrusion of tetrafluoroethylene polymer.

It is well known that polytetrafluoroethylene is difficult to fabricate into various shapes by techniques applicable to most plastics. One method of extruding polytetrafluoroethylene involves prebaking finely divided polymer and then passing the prebaked polymer through a die having a size and shape of the desired finished article, and baking the article at a temperature above 327° C. while passing through the die. An improvement on this method is described in U. S. Patent 2,485,691 and involves using a mixture of prebaked polymer and unbaked polymer for extrusion. These methods produce satisfactory extruded articles for certain applications, but are slow and tedious and not suitable for the production of articles having a small cross-sectional area or for the production of thin coatings of polytetrafluoroethylene on wires. The prior methods referred to above have been used to produce, for example, wire coatings approximately 0.200 inch and greater in thickness; but the rates of extrusion leave much to be desired for operation on a commercial scale, and the method is not well adapted for production of uniform smooth coatings having thicknesses less than 0.100 inch.

A form of polytetrafluoroethylene which has recently been discovered is an aqueous suspension of the polymer which may be used for producing thin coats of the polymer on wire by a dipping technique. However, this method is suited only for very thin coats (i. e., 0.0001 inch to 0.001 inch per single dip) and requires too long a time for entirely satisfactory commercial application of coatings having thicknesses within the range of approximately 0.005 to 0.100 inch.

An object of this invention is to provide an improved process for the extrusion of tetrafluoroethylene polymer into useful articles such as sheets, rods, tubes, filaments, and coatings. A further object is to provide a process for extruding thin-wall tubing and thin coats of polytetraflouorethylene on thin wires at satisfactory rates of speed at room and slightly elevated temperatures. Other objects will be apparent from the description of the invention given below.

The above objects are accomplished according to the present invention by intimately mixing colloidal-sized particles of tetrafluoroethylene polymer, which in particular embodiments have been coagulated from an aqueous colloidal suspension of the polymer, with an organic lubricant having a viscosity of at least 0.45 centipoise at 25° C., said lubricant being liquid under the conditions of subsequent extrusion and present in an amount equal to from 5% to 50% based on the combined weight of said tetrafluoroethylene polymer and lubricant, to obtain a dry, uniform, pressure-coalescing mixture, passing said mixture through a die at a temperature of 15° C. to 150° C. under compacting pressure, and baking the resulting shaped article at a temperature above the sintering temperature of the polymer until sintered. Preferably the mixture contains 15% to 30% of an essentially saturated aliphatic or cycloaliphatic hydrocarbon having a viscosity of at least 0.45 centipoise at 25° C. and a melting point of less than 100° C., and preferably substantially all of said lubricant is removed from the extruded mixture before the temperature of the tetrafluoroethylene polymer reaches the sintering temperature.

Whereas the invention will be described chiefly with respect to polytetrafluoroethylene (i. e., tetrafluoroethylene homopolymer), it is to be understood that the invention also applies to other tetrafluoroethylene polymers. Thus, tetrafluoroethylene copolymers comprising the polymerization product of a mixture of tetrafluoroethylene and another unsaturated organic compound (e. g., ethylene and chlorotrifluoroethylene) containing a terminal ethylenic double bond, said organic compound being copolymerizable with tetrafluoroethylene and being present in said mixture in an amount of up to 15% of the combined weight of tetrafluoroethylene and said organic compound, may be employed in place of polytetrafluoroethylene, provided the presence of the other compounds does not destroy the essential and characteristic qualities of the colloidal particles. Also there may be employed tetrafluoroethylene polymers in which the end groups of the polymer chain are supplied by non-polymerizable compounds (e. g., methanol and ethanol) which are present during the polymerization reaction. The term "tetrafluoroethylene polymer" as used herein covers the above three types of polymers, it being understood that all the tetrafluoroethylene polymers of this invention possess a high degree of polymerization and a sintering temperature of at least 300° C. Above the sintering temperature such polymers form a gel but they do not actually melt to a liquid. This is in contrast to the known relatively low molecular weight polymers derived from tetrafluoroethylene, and certain tetrafluoroethylene polymer waxes, both of which have sharp melting points.

The process of this invention provides a method for producing coatings, such as wire coatings, at a greatly improved rate, especially when such coatings have thicknesses as little as 0.005 to 0.100 inch. Similarly, the process of this invention permits the production of polytetrafluoroethylene filaments having diameters of 0.005 to 0.100 inch at a rapid rate. The invention is based, in part, upon the discovery that tetrafluoroethylene polymer in the form of colloidal-sized particles, in the presence of the lubricants defined herein, can be compacted by extrusion through very narrow orifices at relatively low temperatures to such an extent that upon subsequent removal of lubricant and sintering of the extruded coating, filament or other shaped article, a strong, uniform coating, filament, or otherwise shaped article, is formed.

In a typical extrusion, the dry (i. e., non-aqueous) pressure-coalescing lubricated polymer mixture is fed into the extrusion cylinder of a plastics extrusion machine and the mixture is forced under pressure through an extrusion die which is maintained at a temperature of 15° C. to 150° C. The lubricant in the resulting extruded article is removed by either volatilization or extraction. When substantially all the lubricant has been removed, the extruded article is fed through a sintering oven or bath maintained at a temperature above 327° C. until the polymer is sintered. Preferably the temperature of the sintering oven is maintained in the range of 327° to 450° C. As is well known, the sintering step coalesces the polymer particles into a strong uniform article. The sintering may be followed by quenching the polymer in water or other coolant liquids or gases to yield smooth surfaced articles, or in some cases it may be beneficial to anneal the polymer instead of quenching it. The properties of the sintered polymer may be varied by suitable control of the quenching and annealing temperatures and cycles.

The following examples illustrate specific embodiments of this invention. All parts are by weight unless otherwise specified, and all aqueous colloidal polymer suspensions were prepared as described in U. S. appln. Ser. No. 107,137, filed July 27, 1949, by K. L. Berry. The latter application discloses the polymerization of tetrafluoroethylene at 0° to 100° C. in an aqueous medium in the presence of a water-soluble polymerization catalyst such as disuccinic acid peroxide, i. e. $(HOOCCH_2CH_2COO)_2$, and an alkali metal or ammonium salt of an acid of the formula $H(CF_2CF_2)_{3\ to\ 10}COOH$. These acids are obtainable by oxidizing, with a permanganate oxidizing agent, a polyfluoroalkanol of the formula $H(CF_2CF_2)_{3\ to\ 10}CH_2OH$. The latter compounds are in turn formed by polymerization of tetrafluoroethylene in the presence of methanol and an organic peroxide catalyst at a temperature between 75° C. and 350° C., as disclosed in U. S. Serial No. 65,063, filed by R. M. Joyce on December 13, 1948.

*Example 1.*—One hundred twenty-five parts of a 60% solids aqueous colloidal suspension of polytetrafluoroethylene (75 parts polymer and 50 parts water) is extended with 167 parts distilled water. To this is added 25 parts of a commercial grade of white mineral oil (liquid petrolatum) consisting of a naturally occurring mixture of paraffinic and naphthenic hydrocarbons substantially free of unsaturates (average molecular weight 413.5; boiling range 330°–390° C.; viscosity 115.6 centipoises at 26° C.). The resulting mixture of aqueous polymer suspension and oil is whipped to an emulsion in a Waring blendor while a mixture of 83 parts water and 66 parts acetone is added to coagulate the dispersed polymer. After approximately 3 minutes of agitation following the completed addition of the aqueous acetone, the lubricated coagulated polymer is filtered under strong suction and dried at 110° C. to expel any occluded water.

The resulting, dried mixture is a soft, white, nearly grainy product which is readily extruded into all sorts of shapes. The lubricant remaining after these extruding operations is easily removed either by extracting in such solvents as hexane, naphtha, toluene, etc., or by volatilizing in a heated chamber. The lubricant-free article is then fused to a hard, tough material by heating at a temperature above 327° C., the transition point of the polymer.

In a specific illustration, the above dry, lubricated molding powder is placed in an extrusion chamber fitted with a hydraulically-operated piston to force the lubricated polymer through a circular orifice tapered to a 0.040 inch opening, thereby forming a continuous length of a circular beading or filament. Compacting pressures of about 1,000 to 10,000 pounds per square inch are generally used. Using an orifice having a diameter of 0.040 inch the extrusion is accomplished at a convenient rate at room temperature with a pressure of approximately 2,000 lbs. on a 1.25 inch diameter ram. The lubricated polymer mixture in the form of a filament or beading is particularly suited for rolling into a tape or ribbon-like material by passing between a pair of calendering or smooth-surfaced rolls. From the 0.040 inch beading a tape 0.34 inch wide and 0.006 inch thick is formed. This tape is next freed of the contained lubricant by immersing in toluene which serves as an extracting solvent. The tape is then sintered by passing through a pipe, 1 inch in the inside diameter, electrically heated to an internal temperature of 350–380° C. The resulting tape after cooling has a near-transparent, bluish appearance. On testing, it shows an average tensile strength of 3,200 lb./sq. in. and an average elongation of 200% as determined by the A. S. T. M. test method designated as D–412–41. The tape made by this method is useful as a dielectric insulation for such electrical components as cables, coils, armatures, etc.

*Example 2.*—Dry powdered lubricated polytetrafluoroethylene (75 parts polymer and 25 parts of a commercial grade of cetane having a distillation range of 252° C. to 274° C. and a viscosity of 3.5 centipoises at 25° C.) is prepared by the same procedure as described in Example 1, except the filtered lubricated polymer is dried at 107° C. for 1.5 hours.

The dried lubricated polymer is preformed under hand pressure into a cylindrical slug having an outside diameter of 2.25 inches and a 0.25 inch hole through the longitudinal axis. This preformed slug is placed in an extrusion cylinder having an internal diameter of 2.376 inches. The die having an orifice of 0.080 inch is fastened to the bottom of this cylinder. An electric band heater is located around the die and around the cylinder.

The 20 AWG tinned, solid copper wire to be coated is threaded through a hole in the longitudinal axis of the extrusion ram, through the preformed slug of polymer, and die, and then attached to a leader wire running through the oven zones and the quench bath to the take-off rolls.

The extrusion ram is 6.25 inches long by 2.370 inches in diameter, and has a 1/16 inch hole through the longitudinal axis. It is fitted with a No. 32 O ring. A packing gland on the bottom of the ram prevents excessive flow of polymer and lubricant back-up through the hole during extrusion. This ram is actuated by a hydraulic piston 1.5 inches in diameter.

The die surface temperature is allowed to rise from 54° C. to 110° C. during extrusion and then brought back to 88° C. The polymer first extrudes from the die at a hydraulic pressure of about 750 lbs./sq. in. and this pressure increases to 8,000 lbs./sq. in. during the run. The wire speed is adjusted to a draw-off rate of 1.3 feet per minute.

The coated wire leaving the die passes through the ovens which vaporize the cetane lubricant and then sinter the polymer. The vaporization zone consists of an aluminum pipe 4 feet long by 3 inches outside diameter by 7/8 inch inside diameter. The pipe is heated by electric circular band heaters on the outside surface and the entire assembly is insulated. The temperature of the vaporization zone is 280° C. as measured by a thermocouple mounted in the wall of the oven. The sintering zone is similar to the vaporization section except that the former is only 2 feet long. The wall temperature during the run is 390° C. After leaving the sintering zone, the insulated wire is quenched in water at ambient temperatures and withdrawn by means of draw-off rolls.

Some electrical properties of the coated wire are:

Dielectric strength, short-time—1700 volts/mil
Dissipation factor—0.005 (room temperature; 1000 cycles)
Dielectric constant (K)—1.86 (room temperature; 1000 cycles)

tough, and can be laterally drawn to draw ratios over 300%. Vaporization of the cetane and sintering is accomplished by passing the tape between a pair of parallel strip heaters, the ambient temperature of such an oven being regulated at 350° C. Upon emerging from the oven, the sintered tape is quenched in water at room temperature. The wrinkles in the tape are removed by passing the tape under tension between a pair of 2 inch, steam-heated rolls. By this process, tape of good draw properties and strength is produced. Some of the physical and dielectric properties exhibited by such tape are as follows:

Thickness _____ 0.0105 inch.
Tensile strength _____ 3700 lbs./sq. in.
Elongation _____ 380 percent.
Dielectric K (1000) cycles _____ 2.5 (at room temperature).
Dissipation factor (1000 cycles) _____ 0.0002 (at room temperature).
Volume resistivity _____ 1014 ohm-cm.
Dielectric strength, short-time _____ 1314 volts/mil.

*Example 4.*—An aqueous colloidal suspension of polytetrafluoroethylene was coagulated by vigorous stirring, the water was removed, and the coagulated polymer was dried at 110° C. Several lubricated polymer compositions were prepared using the dried coagulated polymer by dissolving the indicated amounts of each hydrocarbon lubricant in 400 parts of acetone and then adding the dried coagulated polytetrafluoroethylene. The resulting slurry was stirred vigorously for three minutes in a Waring blendor, and then the acetone was removed by evaporation on a steam bath, giving a dry homogeneous molding powder.

Each of the prepared dried lubricated polymer compositions was placed in an extrusion chamber fitted with an hydraulically operated 1.25 inch diameter piston to force the lubricated polymer through a flat sheeting die with a 0.010 inch opening to yield a continuous length of a flat ribbon or tape.

The results of extruding the various compositions is indicated in the following table.

| Lubricant | Polymer, parts | Pressure Developed (p. s. i) | Results |
| --- | --- | --- | --- |
| 19 parts xylene | 81 | 5,000–9,000 | Good extrusion to give smooth flexible tape. |
| 25 parts benzene | 75 | 2,000–4,000 | Extruded readily into a continuous tape with only a few slight cracks. |
| 19 parts n-decane | 81 | 6,000–10,000 | Good extrusion into a smooth continuous tape which in a few minutes lost some of the lubricant and turned to a white opaque sheet. |
| 19 parts n-hexane | 81 | >18,000 | Composition could not be extruded at all—when the die was opened, a molded brittle slug of the composition was removed and it broke apart into small particles upon slight compression. |
| 19.5 parts anisole | 80.5 | 6,000–12,000 | Good extrusion into strong, flexible, tough tape. |
| 19.5 parts methyl benzoate | 80.5 | 14,000–18,000 | Good extrusion into strong, flexible, tough tape. |

*Example 3.*—This example illustrates the preparation of polytetrafluoroethylene tape. Using 25 parts of a refined grade of cetane (n-hexadecane, boiling point 287° C. and viscosity 3 centipoises at 25° C.) and 75 parts of polytetrafluoroethylene, a lubricated composition is prepared according to the procedure of Example 1. The lubricated polymer is charged into an extrusion chamber, cylindrical in shape and tapering to a 0.010 inch slit die. The polymer is forced through the die at approximately 25° C. by a ram actuated by hydraulic pressure in a laboratory Carver press. The extruded tape appears opaque, Each of the five unsintered tapes produced above was placed in an oven and sintered at 380° C. for 20 minutes. In each case the sintered tape was a tough, continuous, transparent to translucent tape, except in the case of the benzene lubricated tape which after sintering had a few minor cracks, which indicated that the viscosity of the benzene lubricant was approaching the critical minimum viscosity which can be used for extrusion under these conditions with this quantity of lubricant.

*Example 5.*—One hundred twenty-five parts of a 60% solids aqueous colloidal suspension of polytetrafluoroethylene (75 parts polymer and 50 parts water) is extended with 167 parts distilled water. To this is added 25 parts of polymethylsiloxane (known commercially as silicone fluid DC-200, having a viscosity of 340 centipoises at 25° C.). The resulting mixture of aqueous polymer suspension and liquid polymethylsiloxane is whipped to an emulsion in a Waring blendor while a mixture of 83 parts water and 66 parts acetone is added to coagulate the dispersed polymer. After approximately 3 minutes of agitation following the completed addition of the aqueous acetone, the lubricated coagulated polymer is filtered under strong suction and dried at 110° C. to expel any occluded water.

For filament extrusion, the dried lubricated polymer is placed in an extrusion chamber fitted with an hydraulically operated piston which forces the lubricated polymer through a circular die tapered to 0.010 inch opening. To facilitate rapid extrusion, the die is heated to 150° C. With an applied force of 4,000–6,000 pounds on a 1.25 inch diameter ram, a continuous monofilament is obtained at rates from 5 to 10 feet per minute. For maximum strength, the filament is further fused by passing through a sintering chamber electrically heated to 350–380° C. giving a tough, transparent filament which can be cold drawn at least four times its original length.

*Example 6.*—The chlorinated lubricant employed in this example is a mixture of chlorinated biphenyls known commercially as "Aroclor" 1242, having a chlorine content of 42%, a boiling point range of 322° C. to 365° C. One hundred twenty-five parts of a 60% solids aqueous colloidal suspension of polytetrafluoroethylene (75 parts polymer and 50 parts water) is extended with 167 parts of distilled water. To this is added 25 parts of the above "Aroclor" 1242, and the mixture is whipped in a Waring blendor while a mixture of 83 parts water and 66 parts acetone is added to coagulate the dispersed polymer. After approximately 3 minutes of agitation following the completed addition of the aqueous acetone, the lubricated coagulated polymer is filtered under strong suction and dried at 110° C. to expel any occluded water.

For filament extrusion, the dried lubricated polymer composition is placed in an extrusion chamber fitted with an hydraulically-operated piston which forces the lubricated polymer through a circular die tapered to 0.040 inch opening. The extrusion is carried out at ordinary room temperature (25° to 30° C.), using an applied pressure of approximately 2,000 lbs. on a 1.25 inch diameter ram. The extruded monofilament is next passed between a pair of calendering rolls to form a tape 1½ inch wide and 0.006 inch thick. This tape is then freed of the lubricant by immersing in toluene which serves as an extracting solvent. The lubricant-free tape is sintered by passing through a heated pipe, 1 inch in inside diameter, and electrically heated to an inner air temperature of 350° to 380° C. The resulting tape has a nearly transparent typical bluish appearance. On testing, this tape exhibits an average tensile strength of 6380 lbs./sq. in. and an average elongation of 353%, as determined by ASTM test method D-412-41. The tape made by this method is useful as a dielectric insulation for such electrical components as cables, coils, armatures, and the like.

The tetrafluoroethylene polymer for use in this invention is obtainable by coagulating an aqueous colloidal suspension of the polymer. It has been found that other finely divided forms of polytetrafluoroethylene, such as the granular form obtained by direct polymerization in accordance with U. S. Patents 2,230,654, 2,393,967, and 2,394,243, the micropulverized form, or any other form which has been mechanically subdivided from the massive polymer and then mixed with the lubricants defined herein, will not extrude uniformly to yield satisfactory extruded articles according to the process of this invention.

The process of preparing the aqueous suspension of tetrafluoroethylene polymer is not the subject of this invention. However, suitable aqueous suspensions of polytetrafluoroethylene may be obtained by the methods described in U. S. Ser. No. 713,385, filed November 30, 1946, by M. M. Renfrew; U. S. Ser. No. 107,137, filed July 27, 1949, by K. L. Berry; and U. S. Patent 2,478,229, issued August 9, 1949, to K. L. Berry. Aqueous suspensions of tetrafluoroethylene copolymers may be obtained by the methods described in U. S. Serial No. 107,137, filed July 27, 1949, by K. L. Berry. Aqueous suspensions of tetrafluoroethylene polymers in which the end groups of the polymer chain are supplied by non-polymerizable compounds may be obtained by the same method as that described for the preparation of the polytetrafluoroethylene suspension as typified by Batch D of Example X in U. S. Serial No. 107,137, filed July 27, 1949, by K. L. Berry, except that, for example, 0.075 part of methanol as the non-polymerizable compound is added with the other reactants to the pressure vessel prior to polymerization. The particle size of the polymer appears to be rather highly critical; i. e., the particles should be colloidal before coagulation, and the smaller the particles the more easily the lubricated mixture extrudes. The particle size of the polymer in the suspensions described in the above-mentioned applications and patent in general ranges from 0.5 to 5 microns, which is the diameter of the average particle determined by an electron microscope measurement on a dried film obtained by depositing a highly diluted aqueous suspension of the polymer on a surface. These colloidal suspensions have been found quite suitable for coagulation for use in the process of this invention. The colloidal particles of polytetrafluoroethylene retain their particulate form during coagulation although agglomeration may occur to some extent, whereby individual particles attach themselves to other particles without necessarily losing their identity, but this does not affect their ability to be extruded when combined with the lubricants defined herein. The coagulated mass is thus a characteristic physical form of the polytetrafluoroethylene. Moreover, polytetrafluoroethylene is virtually insoluble in practically all known solvents, and therefore the particles do not coalesce when merely suspended in organic media. To coalesce the particles in the compositions employed in this invention it is necessary to subject them to the action of heat and/or pressure. The colloidal particles possess marked adsorptive properties, and can be employed as adsorbents for the lubricants used in this invention. In this respect the colloidal form of polytetrafluoroethylene differs from other finely divided forms of the polymer.

The process of this invention may be carried out by employing any organic lubricant which is liquid under the extrusion conditions and has a viscosity at 25° C. of at least 0.45 centipoise, and preferably 0.45–1000 centipoises. Examples of suitable organic lubricants include silicone oils (polyorganosiloxanes) such as polymethylsiloxane, and poly (methyl, phenyl) siloxane; esters such as methyl benzoate, butyl acetate, dibutyl phthalate and tricresyl phosphate; naturally occurring low-melting waxes, nuclear-chlorinated aromatic compounds such as chlorinated benzenes, chlorinated naphthalenes, chlorinated biphenyls, chlorinated phenols, di-n-propyl tetrachlorophthalate, methyl tetrachlorobenzoate; chlorinated paraffins; fluorinated hydrocarbon oils; alcohols such as tertiary butanol; ethers such as methyl phenyl ether (anisole); amines; ketones; essentially saturated aliphatic and cycloaliphatic hydrocarbons; aromatic hydrocarbons such as benzene, toluene, isomeric xylenes, tetrahydronaphthalene, decahydronaphthalene; and commercially available naturally occurring and/or synthetic mixtures of two or more of such lubricants. However, most of the lubricants mentioned other than the hydrocarbons have one or more minor objections from the standpoint of extrusion or the resulting product, although they all permit rapid extrusions at low temperatures. For example, some of the silicone oils do not flash off below the sintering temperature of the polymer, and therefore must be extracted from the extruded unsintered polymer, thus involving an additional time-consuming and expensive step for commercial operation. Certain of the high boiling esters, although they may be volatilized below the sintering temperature of the polymer, char during volatilization, thus resulting in sintered polytetrafluoroethylene articles having poor electrical properties or some discoloration.

For the reasons set forth above the preferred lubricants for most extrusion applications are the essentially saturated aliphatic and cycloaliphatic hydrocarbons. These should have a viscosity of at least 0.45 centipoise at 25° C. and a melting point of less than 100° C. Examples of suitable hydrocarbons include n-octane, n-nonane, n-decane, 2-methyldecane, n-eicosane, petrolatum, paraffin waxes, and mixtures of two or more of such hydrocarbons. Minor amounts of unsaturated aliphatic hydrocarbons are usually present in commercial grades of the paraffin hydrocarbons, but these do not interfere with the practice of this invention, and for this reason the preferred hydrocarbons are termed "essentially saturated." For extrusion over wire a more restricted group of essentially saturated aliphatic and cycloaliphatic hydrocarbons, normally liquid at 25° C. and having a boiling point of 220° C.–400° C. at atmospheric pressure, are preferred. Examples of this restricted group include n-tridecane, dipropylhexylmethane, n-tetradecane, n - pentadecane, n - hexadecane (cetane), 7,8-dimethyltetradecane, n-heptadecane, paraffin oils, mineral oils, and commercially available mixtures in the boiling range of 220° C.–400° C.

Certain physical properties of the organic lubricant are rather highly critical. Thus, it has been found that the viscosity of the lubricant and to some extent the lubricity greatly influence the extrusion of the colloidal polytetrafluoroethylene, particularly when subjected to pressure. For example, a hydrocarbon such as n-hexane, which has a viscosity at 25° C. of about 0.3 centipoise, will not produce uniform extruded articles at satisfactory rates. In fact, when pressure is applied to the mixture of colloidal polytetrafluoroethylene and hexane under the extrusion conditions of this invention, the hexane is not retained by the polymer; hence, there is no continuity of extrusion, resulting in non-uniform articles containing irregular shapes, fissures, and the like. This is the reason for the critical minimum viscosity of 0.45 centipoise at 25° C. Since one of the outstanding advantages of this process is the relatively low temperature of extrusion of the polymer mixture, the lubricant employed should be liquid under the extrusion conditions selected.

The proportion of lubricant in the lubricated polymer mixture is critical since proportions lower than 5% will not give smooth extrusions, whereas when the lubricant is employed in amounts greater than 50%, the mixtures are usually so fluid the flow cannot be controlled under pressure to give accurate tolerances in the finished articles. It is preferred to use from 15% to 30% of lubricant or mixture of two or more lubricants. All percentages of lubricant throughout the specification are based on the combined weight of dry tetrafluoroethylene polymer and lubricant in the composition.

Lubricated mixtures of tetrafluoroethylene polymer and lubricant employed in practicing this invention may be prepared by various methods. One such method comprises intimately mixing the lubricant or solution thereof with an aqueous suspension of colloidal polytetrafluoroethylene under high speeds of agitation, followed by coagulation accomplished by the addition of either an electrolyte or a water-miscible organic liquid, such as acetone or alcohol. An equally satisfactory method for obtaining the lubricated mixtures involves coagulating an aqueous suspension of colloidal polytetrafluoroethylene, drying the coagulated polymer, suspending the coagulated polymer in an organic liquid vehicle (e. g., methanol or tertiary butanol), and then adding the lubricant or solution thereof with continuous stirring, followed by filtering or evaporation of the suspending vehicle. Another method comprises spraying a mist of the lubricant or a solution thereof onto the dried coagulated polymer particles while the particles are being tumbled in a rotating blender. The only requirement for obtaining a satisfactory lubricated mixture for use in this invention is to thoroughly and intimately disperse the lubricant throughout the polymer particles. The resulting dried lubricated mixture varies from a putty-like mass to a pulverulent solid, depending upon the amount and type of lubricant employed.

Other materials may be incorporated in the lubricated polymer mixtures depending upon the properties desired in the finished articles obtained from the extrusion process. Thus, it has been found that finely divided solid fillers, pigments, dyes, other lubricants, stabilizers, plasticizers, and the like may be added to the mixture in varying amounts. Examples of suitable fillers and pigments which may thus be employed include carbon black, graphite, mica, talc, silica, asbestos, and titanium dioxide. All of these fillers and pigments should be in finely divided form and preferably should be of the approximate particle size of the polymer used in the mixture. The fillers and pigments may be employed in amounts varying from relatively small amounts up to as much as 400%, based on the dry weight of the tetrafluoroethylene polymer in the mixture. These additional modifiers may be incorporated into the mixture at any time prior to extrusion. However, the preferred method for incorporating fillers and pigments involves coagulating the aqueous colloidal polymer suspension in the presence of the dispersed fillers, pigments and lubricant. The fillers and pigments serve either to color the polymer or to extend and reinforce the polymer, resulting in mixtures having increased elongation in some cases and in mixtures having a lower cost where a cheap filler is selected. However, if the best electrical properties inherent in the polytetrafluoroethylene are desired, it will generally not be practical to employ large amounts of these other additives.

The extrusion temperature of 15° C. to 150° C. refers to the approximate surface temperature of the extrusion die which is actually at a slightly higher temperature than that of the polymer passing through the die. This extrusion temperature range when compared with prior methods of extruding polytetrafluoroethylene provides a relatively cold extrusion process. The rates of extrusion in the present process are many times greater than that previously obtained with polytetrafluoroethylene extrusions. This is due to a large extent to the particular combination of the herein defined lubricants and the particular characteristics of the type of tetrafluoroethylene polymer which is obtainable by coagulating an aqueous colloidal suspension of the polymer. The upper temperature limit for the extrusion is governed by the loss of lubricant from the mixture being extruded. The boiling points of the lubricants used in the mixtures are such that a temperature of 150° C. will in general not be exceeded. This is particularly important during extrusion of these lubricated polymer mixtures, for if too much of the lubricant is lost during the extrusion, the pressures initially developed may be multiplied 5 to 10 times during the process, causing the extrusion rate to decrease quite rapidly and resulting in non-uniform extruded articles and coatings. The preferred range for extrusion is to hold the surface temperature of the extrusion die to 65° C.–110° C., particularly in the case of extruding the lubricated mixtures over wires to form thin coatings. The hotter extrusions in the preferred temperature range appear to produce tougher, smoother, and harder coatings on wire than do the room temperature extrusions, although the latter may be used for preparing other extruded articles such as sheeting, rods and tubes. The pressure employed in forcing the lubricated mixtures through the extrusion die is not critical, provided sufficient pressure is maintained to provide a continuous smooth extrusion and a constant caliper. Typical hydraulic pressures which have been measured in coating wire with a lubricated mixture have varied from 500 lbs./sq. in. to 15,000 lbs./sq. in. on a 1.50 inch ram. In general, the pressure may vary anywhere from 100 lbs./sq. in. up to at least 200,000 lbs./sq. in., said pressure being developed at the cross-sectional area of the extrusion orifice. It will be obvious that the higher the proportion of lubricant in the mixture to be extruded, the lower is the pressure required to produce a smooth extruded article or coating, and vice versa.

The removal of the lubricant from the extruded shaped tetrafluoroethylene polymer before the polymer reaches the sintering temperature (i. e. 327° C. for polytetrafluoroethylene) is optional in the process of this invention. However, for certain applications, substantially complete removal before sintering may be required, whereas in other applications, it may be merely advantageous to remove some or most of the lubricant prior to sintering. In cases where the extruded polymer is led directly into a sintering oven, care should be taken to avoid fire hazards, since the hydrocarbon lubricants employed may catch fire if led directly into an oven which is at a temperature of 327° C. and above. The method for removal of the lubricant is not critical. It is preferred to remove the hydrocarbon lubricants from the extruded articles by passing the extruded articles through an electrically-heated oven maintained at a temperature of approximately 200° C.–350° C., and the hydrocarbons are thereby volatilized. The hydrocarbons and other lubricants may also be removed by extraction by passing or drawing the extruded article through a bath of acetone, toluene, or other suitable extracting solvents prior to sintering. Other methods of removal include stripping and evacuation under reduced pressures. For certain applications disadvantages may be encountered with incomplete removal of the lubricant prior to sintering, for should a substantial quantity of the lubricant be retained in the extruded polymer, residues resulting from treating this lubricant above 327° C. for too long a time may be retained in the sintered article, and these residues may impair the electrical properties, color, and other physical properties of the sintered article. For the above reasons it is preferred for most electrical applications and some other applications to remove substantially all of the lubricant prior to sintering.

The process of this invention may be operated batchwise or continuously. The lubricated mixture may be intermittently or continuously fed into a cylindrical extrusion chamber provided with a hydraulically or mechanically actuated ram, thus forcing the mixture through the extrusion orifice or orifices. Two general types of ram operating devices will be briefly described as exemplary of typical extrusion means for employment in the process of this invention, although other standard plastics extrusion machines may be used, such as a screw stuffer. A positive displacement hydraulic pump may operate to pump oil into a hydraulic cylinder forcing the piston and its connecting ram to move against the back pressure of the lubricated polymer in the extrusion cylinder. The rate of pumping and thereby the speed of the ram is dependent upon and may be controlled by the pump pressure. A simple by-pass on the pump discharge line provides a simple means to control the speed. The other device operates on a constant displacement principle. An example of such a device would be a ram driven by a mechanical screw drive. In this case the speed of the ram would be practically independent of the pressure within the extrusion cylinder. Such pressures may be measured by calibrated strain gauges connected to the ram. The advantage in this instance is that a constant rate of extrusion is maintained.

Another variable in the process of this invention involves the preparation of a preform of the lubricated mixture prior to extrusion. This preform may be prepared by transferring the lubricated polymer to a preform cylinder having substantially the same size and shape as the extrusion cylinder to be used and exerting mild pressure against the disc faces of the cylinder. The chief advantage of using a preform is that the lubricated polymer has an increased density.

A typical wire coating extrusion is described below for the production of thin coatings of polytetrafluoroethylene on small diameter wires, this example showing a particular set of preferred conditions for extrusion. In this particular wire coating a lubricated mixture, prepared from 75 parts of dried polytetrafluoroethylene coagulated from an aqueous colloidal suspension of the polymer and 25 parts of cetane (one of the preferred hydrocarbon lubricants for wire extrusion), are pressed into a preform having a concentric hole in its longitudinal direction. The preform is then lowered into the extrusion cylinder. Wire which has been threaded through a piston is passed through the preform and die assembly and spliced to the wire leader running through a vaporizing chamber, sintering oven, and quenching bath, to the draw-off assembly. The slack in the wire is taken up by running the draw-off rolls, and the piston is then lowered to make contact with the preform. The drawoff rolls and hydraulic pump are then started, the latter operating to force a brass piston against the preform in the extrusion cylinder. Operating at rates of approximately 2 to 3 feet per minute, the coating on the wire begins to appear at hydraulic pressures of 2,000 lbs./sq. in. using a 1.50 inch ram. During the first 50 to 100 feet of extruded coating the initial pressure rises to 3,000–4,000 lbs./sq. in. and then levels off and remains constant during the rest of the extrusion. The wall temperature of the vaporizing chamber is maintained at approximately 300° C. and the wall temperature of the sintering oven at approximately 400° C., whereas the temperature of the die is maintained at 80° C.–100° C. and the water quench bath at approximately 25° C. The 0.015 inch polytetrafluoroethylene coating on No. 20 AWG copper wire is fully fused and translucent in appearance. The coating is smooth, uniform and adherent and is characterized by the excellent physical and dielectric properties of sintered polytetrafluoroethylene.

The process of this invention may be employed to produce a variety of useful extruded articles of tetrafluoroethylene polymer. Examples of such articles include filaments, beading, films, sheets, tubes, rods, tapes, and coatings on wires and fabrics. Also, precoated wires and spirally wrapped and braided wires may be coated with tetrafluoroethylene polymer according to the process of this invention. Still further, a number of wires may be coated in one extrusion operation by employing multiple extrusion orifices. The fibers obtained may be used for cordage, screens, and filter media.

The chief advantage of the process of this invention over the prior methods of extruding polytetrafluoroethylene is that the present process provides a much higher rate of extrusion at relatively low temperatures. For example, heretofore, it has been possible to extrude polytetrafluoroethylene in granular form or micropulverized form, whether prebaked or mixtures of prebaked and unbaked polymer were used, at rates up to approximately 50 feet per hour above 327° C., but these extrusions produced only relatively thick articles and relatively thick coatings of polymer on wire. By the improved process of this invention it is now possible for the first time to extrude polytetrafluoroethylene at rates up to and over 50 feet per minute to produce smooth articles and coatings on wire. When the process of this invention is employed using the same lubricants defined herein, but substituting finely divided granular or micropulverized polytetrafluoroethylene for the colloidal coagulated polymer, the lubricated polymer fails to extrude except as broken shreds or as articles having very rough surfaces and non-uniform caliper. This indicates that the particular lubricants and particular type of polytetrafluoroethylene are quite critical and that these two factors when combined and used according to this invention produce a mixture which has unexpectedly superior properties and which will extrude into smooth continuous articles. Additional experiments have shown that the preferred lubricants of this invention (e. g., cetane) actually exude from the granular polymer when even slight hydraulic pressures are applied in an attempt to extrude this type of mixture. The granular polymer/cetane mixture is quite different from the corresponding colloidal coagulated polymer/cetane mixture in that the former shows no pressure-coalescing property when pressed on a flat surface, whereas the pressure-coalescing property is characteristic of the latter composition. Furthermore, it has been found that direct extrusion of aqueous colloidal suspensions of polytetrafluoroethylene into shaped articles, followed by sintering, results in unsatisfactory articles containing cracks, fissures and other imperfections, unless certain limitations are observed. Thus, in U. S. appln. Ser. No. 107,136, filed July 27, 1949, by Kenneth L. Berry, there is described a process which comprises extruding certain types of aqueous colloidal dispersions of polytetrafluoroethylene into a coagulating medium to form a shaped structure and thereafter sintering said structure at a temperature above 327° C. The coagulating medium in the Berry process may be an aqueous bath or a gaseous atmosphere, but usually requires a washing step to remove the acid or other coagulating agent prior to sintering the shaped structure. The Berry process is obviously more expensive on a commercial scale than that of the present invention, which is an improvement over the Berry process in that it entirely eliminates the coagulating medium and operates as a direct dry extrusion process. Another important advantage of this invention is that it provides a commercial process for the extrusion of polytetrafluoroethylene at temperatures well below those which have been required heretofore for fabrication of this high-temperature softening, heat-resistant polymer, and, in fact, extrusions may be carried out at as low as room temperature. A further advantage of this process lies in the fact that polytetrafluoroethylene coatings in the range of 0.005–0.100 inch and higher in thickness may be applied to wire in one pass, and thereafter, if desired, additional coatings may be applied according to the same process to build up thicker coatings (e. g., greater than 0.100 inch total thickness). It has not been possible heretofore to apply coatings of polytetrafluoroethylene in this range of thicknesses in one operation, thereby illustrating the advance in the art provided by this process.

A particularly suitable application for this invention involves a simplified method for joining spliced sections of polytetrafluoroethylene coated wire conductors. This method involves the steps of wrapping the spot to be spliced with one or more layers of unsintered polytetrafluoroethylene tape extruded from one of the lubricated mixtures set forth in this invention, and thereafter heating the resulting assembly above 327° C. to sinter the polytetrafluoroethylene, and effect bonding between the conductor and its coating. It is noteworthy that only a lubricated tape prepared by the process of this invention will work effectively. In the preparation of the polytetrafluoroethylene tape any suitable lubricant defined herein may be used. This method is useful in joining any number of lengths of polytetrafluoroethylene coated wire with a wrapping that insures the continuity of the electrical and physical properties of the coating. In addition, the method is highly suitable for use in the field by merely carrying a small hand operated heater which may be used to effect fusion of the wrapping under service conditions.

We claim:

1. A process for shaping tetrafluoroethylene polymers which comprises extruding through a die at a temperature of 15° to 150° C. under compacting pressure a non-aqueous pressure-coalescing composition which comprises tetrafluoroethylene polymer particles of colloidal size intimately admixed with an organic lubricant having a viscosity of at least 0.45 centipoise at 25° C., said lubricant being liquid under the extrusion conditions and present in quantity of from 5% to 50% of the combined weight of said tetrafluoroethylene polymer and lubricant, and thereafter baking the resultant shaped article at a temperature above the sintering temperature of the polymer, said lubricant being essentially a hydrocarbon lubricant from the group consisting of saturated aliphatic and cycloaliphatic hydrocarbons.

2. Process of claim 1 in which the said hydrocarbon lubricant is liquid petrolatum.

3. The process of claim 1 in which the said tetrafluoroethylene composition is extruded in the form of a coating on wire.

4. The process of claim 3 in which the thickness of the said coating is between 0.005 and 0.100 inch.

5. The process of claim 1 in which the said tetrafluoroethylene polymer composition is extruded in the form of a filament.

6. The process of claim 1 in which the said tetrafluoroethylene polymer composition is extruded in the form of a continuous film, tape, sheet, or the like.

7. A process for shaping polytetrafluoroethylene which comprises extruding through a die at a temperature of 65° to 110° C. under a compacting pressure within the range of 100 to 200,000 pounds per square inch a non-aqueous pressure-coalescing composition which comprises coagulated polytetrafluoroethylene particles of colloidal size intimately admixed with a lubricant which is essentially a hydrocarbon lubricant from the group consisting of saturated aliphatic and cycloaliphatic hydrocarbons having a viscosity of 0.45–1,000 centipoises at 25° C. and being present from 15% to 30% based on the combined weight of said polytetrafluoroethylene and hydrocarbon, and thereafter baking the resultant shaped article at a temperature of 327° to 450° C.

8. The process of claim 7 in which the said hydrocarbon is normally liquid at 25° C. and has a boiling point of 220° C.–400° C. at atmospheric pressure.

9. The process of claim 7 in which the said hydrocarbon is liquid petrolatum.

10. The process of claim 1 in which substantially all of the said organic lubricant is removed before the temperature of the polymer reaches the sintering temperature.

11. The process of claim 1 in which substantially all of said hydrocarbon is removed by volatilization before the temperature of the polymer reaches the sintering temperature.

References Cited in the file of this patent

UNITED STATES PATENTS

| Number | Name | Date |
| --- | --- | --- |
| 2,122,053 | Burkhardt | June 28, 1938 |
| 2,379,166 | Lucid | June 26, 1945 |
| 2,400,099 | Brubaker | May 14, 1946 |